United States Patent
Umezuki

(10) Patent No.: US 8,976,652 B2
(45) Date of Patent: Mar. 10, 2015

(54) RELAY DEVICE, METHOD OF CONTROLLING RELAY DEVICE, AND RELAY SYSTEM

(71) Applicant: Fujitsu Limited, Kawasaki-shi (JP)

(72) Inventor: Takeshi Umezuki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 146 days.

(21) Appl. No.: 13/711,694

(22) Filed: Dec. 12, 2012

(65) Prior Publication Data

US 2013/0242745 A1  Sep. 19, 2013

(30) Foreign Application Priority Data

Mar. 19, 2012  (JP) ................................. 2012-062651

(51) Int. Cl.

| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/801 | (2013.01) |
| H04L 12/803 | (2013.01) |
| H04L 12/703 | (2013.01) |
| H04L 12/721 | (2013.01) |

(52) U.S. Cl.
CPC ............... *H04L 47/33* (2013.01); *H04L 47/125* (2013.01); *H04L 47/122* (2013.01); *H04L 47/11* (2013.01); *H04L 47/17* (2013.01); *H04L 47/12* (2013.01); *H04L 47/10* (2013.01); *H04L 45/66* (2013.01); *H04L 45/28* (2013.01)
USPC .......................................... 370/230; 370/235

(58) Field of Classification Search
None
See application file for complete search history.

(56) References Cited

U.S. PATENT DOCUMENTS

| | | | |
|---|---|---|---|
| 7,554,910 B2 | 6/2009 | Iwata et al. | |
| 2006/0126503 A1* | 6/2006 | Huck et al. | 370/225 |
| 2007/0147241 A1* | 6/2007 | Wang et al. | 370/230 |
| 2008/0253366 A1* | 10/2008 | Zuk et al. | 370/389 |
| 2009/0161692 A1 | 6/2009 | Hirata et al. | |

FOREIGN PATENT DOCUMENTS

| | | |
|---|---|---|
| EP | 1601139 A1 * | 11/2005 |
| JP | 2006-268625 | 10/2006 |
| JP | 2009-303090 | 12/2009 |
| JP | 2011-508523 | 3/2011 |

* cited by examiner

*Primary Examiner* — Christopher Crutchfield
(74) *Attorney, Agent, or Firm* — Fujitsu Patent Center

(57) ABSTRACT

An L2 switch includes a storage unit, a detection unit, a selection unit, and a notification unit. The storage unit stores a plurality of relay paths connecting a source device and a destination device that receives information from the source device. The detection unit detects occurrence of congestion between the host L2 switch and an adjacent L2 switch in a first path among the plurality of relay paths. The selection unit selects a second path from among the plurality of relay paths in the case where the occurrence of congestion has been detected. The notification unit notifies, through an L2 switch adjacent to the host L2 switch in the second path, an L2 switch adjacent to the source device that the second path is to be used as a detour path.

8 Claims, 8 Drawing Sheets

| SOURCE SWITCH | DESTINATION SWITCH | PORT | COST |
|---|---|---|---|
| RB1 | RB3 | PORT C | 100 |
| RB1 | RB2 | PORT B | 100 |
| RB1 | RB3 | PORT B | 200 |
| RB2 | RB1 | PORT D | 100 |
| RB2 | RB3 | PORT E | 100 |
| RB3 | RB1 | PORT F | 100 |
| RB3 | RB2 | PORT G | 100 |
| ... | ... | ... | ... |

| SOURCE SWITCH | DESTINATION SWITCH | PORT |
|---|---|---|
| RB1/xxx | RB3/yyy | PORT B |
| RB2/xxx | RB3/yyy | PORT E |

RELAY DEVICE, METHOD OF CONTROLLING RELAY DEVICE, AND RELAY SYSTEM

CROSS-REFERENCE TO RELATED APPLICATION

This application is based upon and claims the benefit of priority of the prior Japanese Patent Application No. 2012-062651, filed on Mar. 19, 2012, the entire contents of which are incorporated herein by reference.

FIELD

The embodiments discussed herein are directed to a relay device, a method of controlling the relay device, and a relay system.

BACKGROUND

FCoE (Fibre Channel over Ethernet) is a protocol for transmitting data of an FC (Fibre Channel) over Ethernet (registered trademark, to be interpreted in the same way hereinafter). There is a technology of using the FCoE to cause a LAN (Local Area Network) and a SAN (Storage Area Network) to converge on the same physical network. The LAN connects a server and a client, while the SAN connects the server and a storage device. The network constituted by the converged LAN and SAN is referred to as a "converged LAN/SAN network".

The converged LAN/SAN network will be described with reference to FIG. 10. FIG. 10 is a diagram illustrating an example of the converged LAN/SAN network. As illustrated in FIG. 10, a converged LAN/SAN network 900 includes relay devices 901 to 907 that relay an IP (Internet Protocol) packet and an FCoE packet. L3 switches 700a and 700b, information processing devices 800a to 800c, and a storage device 800e are connected to the converged LAN/SAN network 900.

In this converged LAN/SAN network 900, as illustrated in FIG. 10, each relay device is connected to adjacent relay devices to constitute a multipath network. All paths in the multipath network are active; none of the paths is on standby. This enables each relay device to transfer a packet through any path, thus increasing a bandwidth thereof.

To transfer an IP packet or an FCoE packet, each relay device in the converged LAN/SAN network 900 selects a path with the lowest link cost through TRILL (Transparent Interconnection of Lots of Links). To transfer an FCoE packet from the information processing device 800a to the storage device 800e in the example illustrated in FIG. 10, the converged LAN/SAN network 900 selects a path that goes through the relay device 901, the relay device 902, and the relay device 903.

Patent Document 1: Japanese Laid-open Patent Publication No. 2006-268625
Patent Document 2: Japanese Laid-open Patent Publication No. 2009-303090
Patent Document 3: Japanese National Publication of International Patent Application No. 2011-508523

In the above-described related art, however, there is a problem in that the bandwidth is not effectively used.

More specifically, the converged LAN/SAN network always selects a shortest path, although all the paths in the network are active. Therefore, congestion may occur upon concentration of IP packets and FCoE packets at a port of the relay device on the shortest path.

An example will be described where, in FIG. 10, an FCoE packet is transferred from the information processing device 800b to the storage device 800e at the same time as another FCoE packet is transferred from the information processing device 800a to the storage device 800e. For easy understanding of the description, it is assumed that each path has a bandwidth of 10 GB.

In the case where 10 GB information is transferred from the information processing device 800a and 7 GB information is transferred from the information processing device 800b, the relay device 902 transfers the 17 GB information to the relay device 903. As a result, the relay device 902 transfers, to the relay device 903, the information of the size exceeding the bandwidth, thus causing congestion between the relay device 902 and the relay device 903.

Upon detecting the occurrence of congestion, the relay device 903 prevents abandonment of the FCoE frame in order to secure the order of data. For example, the relay device 903 notifies the information processing device 800a and the information processing device 800b of the occurrence of congestion by transmitting CN (Congestion Notification) frames thereto. Upon receiving the CN frames, the information processing device 800a and the information processing device 800b adjust, through traffic shaping, the transfer amount so as not to generate a frame loss, thereby controlling the bandwidth.

SUMMARY

According to an aspect of embodiments, a relay device includes, a storage unit that stores a plurality of relay paths connecting a source device and a destination device that receives information from the source device, a detection unit that detects occurrence of congestion between the host relay device and an adjacent relay device to the relay device in a first path among the plurality of relay paths, a selection unit that selects a second path from among the plurality of relay paths stored in the storage unit in the case where the detection unit has detected occurrence of congestion, and a notification unit that notifies, through an adjacent relay device adjacent to the host relay device in the second path, an adjacent relay device adjacent to the source device that the second path is to be used as a detour path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a table of exemplary information stored in an inter-switch routing table;
FIG. 4 is a table of exemplary information stored in an inter-switch MAC routing table.

DESCRIPTION OF EMBODIMENTS

Preferred embodiments of the present invention will be explained with reference to accompanying drawings. Note that the present invention is not limited to the embodiments. The embodiments can be appropriately combined as long as there is no inconsistency between the processes thereof.

[a] First Embodiment

In a first embodiment, a Layer 2 (L2) switch included in a converged LAN (Local Area Network)/SAN (Storage Area Network) network will be described as an example of the relay device disclosed in the present application.

Configuration of Converged LAN/SAN Network According to First Embodiment

Figure 1:
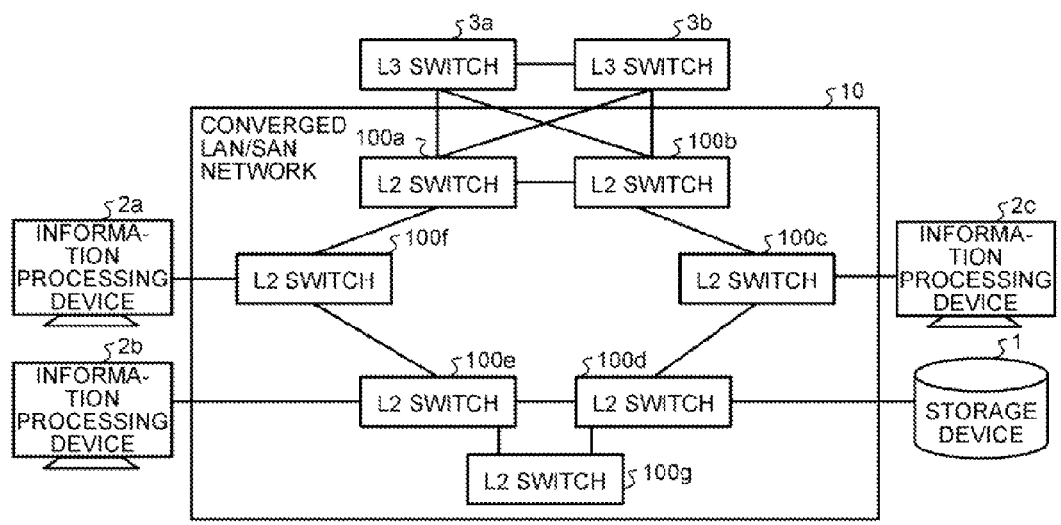
FIG. 1 is a block diagram illustrating a configuration of a converged LAN/SAN network according to a first embodiment.

FIG. 1 is a block diagram illustrating a configuration of the converged LAN/SAN network according to the first embodiment. As illustrated in FIG. 1, a converged LAN/SAN network 10 is connected to a storage device 1, an information processing device 2a, an information processing device 2b, an information processing device 2c, an L3 (Layer 3) switch 3a, and an L3 switch 3b. Note that the numbers of the storage devices, the information processing devices, and the L3 switches connected to the converged LAN/SAN network 10 are not limited to those illustrated.

The storage device 1 constitutes, for example, RAID (Redundant Arrays of Inexpensive Disks) and stores therein various data. The information processing devices 2a to 2c are, for example, servers and transmit/receive information to/from the other information processing devices and the storage device.

The L3 switch 3a connects the converged LAN/SAN network 10 to another LAN network or another converged LAN/SAN network.

The converged LAN/SAN network 10 includes an L2 switch 100a, an L2 switch 100b, an L2 switch 100c, an L2 switch 100d, an L2 switch 100e, an L2 switch 100f, and an L2 switch 100g. In the description below, the L2 switches 100a to 100g may be collectively referred to as an L2 switch 100 in general.

Each L2 switch in the converged LAN/SAN network 10 includes a plurality of ports (not illustrated) and is connected to the adjacent L2 switches via the ports. Note that the connection state between the L2 switches is not limited to that illustrated in the figure. For example, the L2 switches may be connected to one another in the form of a mesh in the converged LAN/SAN network 10.

The L2 switch 100 is an FCoE (Fibre Channel over Ethernet)-compatible switch with both functions of an FC switch and an Ethernet switch, and processes FCoE traffic and IP traffic.

The IP traffic includes, for example, a packet and a frame exchanged between the information processing devices, and a packet and a frame exchanged between the information processing device and the storage device through a management LAN of the storage device.

The FCoE traffic includes a packet and a frame for reading or writing, exchanged between the information processing device and the storage device. As described herein, the packet and the frame for reading include read data and a read command, and the packet and the frame for writing include write data and a write command.

The L2 switch 100 stores a plurality of relay paths that connect a source device and a destination device, which receives information from the source device. In the case where information is input through any port, the L2 switch 100 selects a shortest path from among the plurality of relay paths and outputs the information to the selected port in the shortest path. In the description below, the shortest path is referred to as a "first path".

In this converged LAN/SAN network 10, the L2 switch 100 stores a plurality of relay paths that connect the source device and the destination device, which receives information from the source device. The L2 switch detects the occurrence of congestion between itself and the adjacent L2 switch in the first path among the plurality of relay paths. Upon detecting the occurrence of congestion, the L2 switch selects a second path from among the plurality of relay paths. The L2 switch then notifies, through its adjacent L2 switch in the second path, another L2 switch adjacent to the source device that the second path is to be used as a detour path.

In this manner, the L2 switch 100 selects an alternative path upon detecting congestion in the shortest path among the plurality of relay paths connecting the source device and the destination device, and causes the relay device adjacent to the source device to use the alternative path as a detour path. It is therefore possible to effectively use a bandwidth.

Functional Configuration of L2 Switch According to First Embodiment

Figure 2:
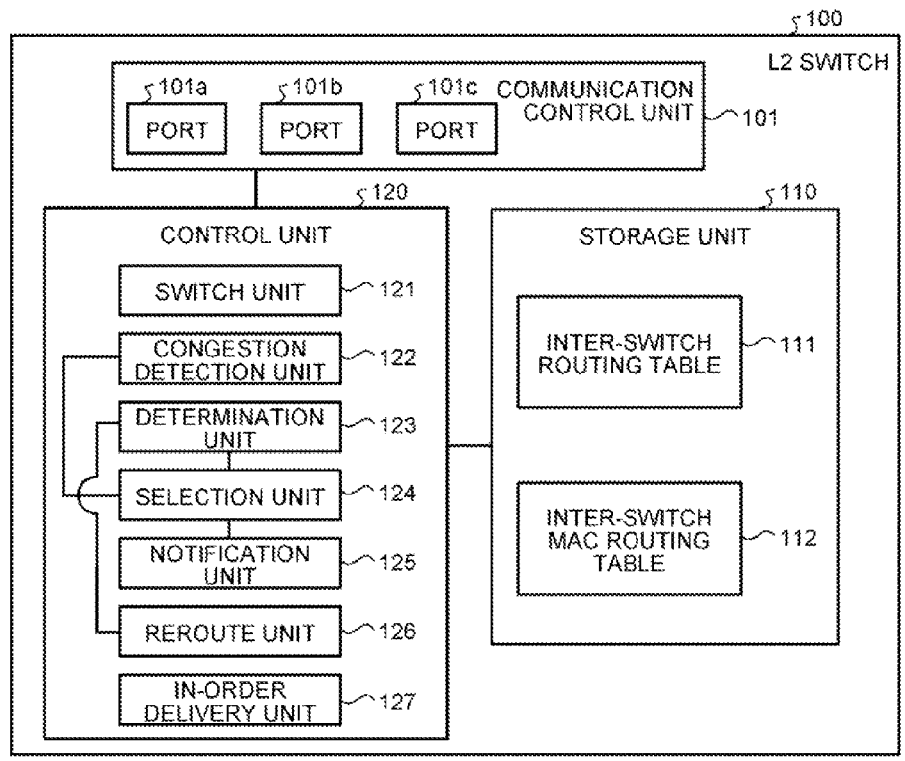
FIG. 2 is a block diagram illustrating a functional configuration of an L2 switch according to the first embodiment.

A functional configuration of the L2 switch 100 according to the first embodiment will be described next with reference to FIG. 2. FIG. 2 is a block diagram illustrating the functional configuration of the L2 switch according to the first embodiment. The L2 switch 100 according to the first embodiment includes a communication control unit 101, a storage unit 110, and a control unit 120.

The communication control unit 101 includes a port 101a, a port 101b, and a port 101c, and controls exchange of information between each port and the corresponding adjacent port. For example, in the case where each port receives information from the corresponding adjacent port, the communication control unit 101 outputs the received information to the control unit 120. In the case where each port receives information from the control unit 120, the communication control unit 101 transmits the received information to the corresponding adjacent port. Note that the number of ports included in the communication control unit 101 is not limited to that illustrated in the figure.

The storage unit 110 is, for example, a semiconductor memory element and includes an inter-switch routing table 111 and an inter-switch MAC (Media Access Control) routing table 112.

The inter-switch routing table 111 stores a plurality of relay paths that can be used simultaneously and connect the source device and the destination device, which receives information from the source device. In this case, all the relay paths that can be used simultaneously are active. The inter-switch routing table 111 stores information that is commonly used among the L2 switches included in the converged LAN/SAN network 10. The details of the inter-switch routing table 111 will be described later with reference to FIG. 3.

The inter-switch MAC routing table 112 stores a second path. The details of the inter-switch MAC routing table 112 will be described later with reference to FIG. 4.

The control unit 120 includes a switch unit 121, a congestion detection unit 122, a determination unit 123, a selection unit 124, a notification unit 125, a reroute unit 126, and an in-order delivery unit 127. The control unit 120 is, for example, an electronic circuit such as a CPU (Central Processing Unit) or an MPU (Micro Processing Unit).

In the case where information is input through any port, the switch unit 121 identifies a destination of the information and selects, from the inter-switch routing table 111, a port that can transfer the information to the identified destination through a shortest path. The switch unit 121 then outputs the information to the selected port.

In the case where the congestion detection unit 122 (described later) detects the occurrence of congestion between the host L2 switch and the adjacent L2 switch in the first path, the switch unit 121 transmits a CN (Congestion Notification) frame to the source device through the first path. As a result, upon receiving the CN frame, the source device adjusts, through traffic shaping, the transfer amount so as not to generate a frame loss, thereby controlling the bandwidth.

The congestion detection unit 122 detects the occurrence of congestion between the host L2 switch and the adjacent L2 switch in the first path among the plurality of relay paths. Upon detecting the occurrence of congestion, the congestion detection unit 122 notifies the switch unit 121 and the selection unit 124 to that effect.

When the determination unit 123 is notified, by the L2 switch adjacent to the host L2 switch in the second path, that the second path is to be used as the detour path, the determination unit 123 determines whether the host L2 switch is adjacent to the source device.

Upon determining that the host L2 switch is adjacent to the source device, the determination unit 123 notifies the reroute unit 126 to that effect. Upon determining that the host L2 switch is not adjacent to the source device, the determination unit 123 notifies the selection unit 124 to that effect.

The selection unit 124 selects the second path from among the plurality of relay paths stored in the inter-switch routing table 111. For example, the selection unit 124 selects the second path in the case where the congestion detection unit 122 determines that congestion has occurred. Alternatively, the selection unit 124 selects the second path in the case where the determination unit 123 is notified by the adjacent L2 switch that the second path is to be used as the detour path and then the determination unit 123 determines that the host L2 switch is not adjacent to the source device.

For example, the selection unit 124 creates a list of alternative paths with a link cost equal to or lower than a threshold value with reference to the plurality of relay paths stored in the inter-switch routing table 111, and determines a path that does not go through the first path. The selection unit 124 then determines whether the traffic can be transferred through the determined path.

In this case, upon determining that the traffic can be transferred through the determined path, the selection unit 124 creates the inter-switch MAC routing table 112. The selection unit 124 then determines to transfer a frame using the inter-switch routing table 111 and the inter-switch MAC routing table 112.

Upon determining that the traffic is disable to be transferred through the determined path, the selection unit 124 searches for an alternative path and determines whether the alternative path can be determined. Upon determining that the path cannot be determined, the selection unit 124 determines that there is no alternative path that can be used, and controls the bandwidth.

Upon determining that the path can be determined, on the other hand, the selection unit 124 determines whether the traffic can be transferred through the determined path.

The selection unit 124 notifies, through the L2 switch adjacent to the host L2 switch in the second path, the L2 switch adjacent to the source device that the second path is to be used as the detour path.

The notification unit 125 notifies, through the L2 switch adjacent to the host L2 switch in the second path selected by the selection unit 124, the L2 switch adjacent to the source device that the second path is to be used as the detour path.

For example, in the case where the host L2 switch detects the occurrence of congestion, the notification unit 125 notifies, through the L2 switch adjacent to the host L2 switch in the second path selected by the selection unit 124, the L2 switch adjacent to the source device that the second path is to be used as the detour path. Upon receiving the notification of the second path from the adjacent L2 switch, the notification unit 125 executes the following processing. That is, the notification unit 125 notifies, through the L2 switch adjacent to the host L2 switch in the second path and different from the source of the notification, the L2 switch adjacent to the source device that the second path selected by the selection unit 124 is to be used as the detour path.

In the case where the determination unit 123 determines that the host L2 switch is adjacent to the source device, the reroute unit 126 executes the following processing. That is, the reroute unit 126 determines whether the CN notification-based bandwidth control is underway. In this case, upon determining that the CN notification-based bandwidth control is not underway, the reroute unit 126 refers to the inter-switch routing table 111 and determines to transfer the traffic through the first path.

Upon determining that the CN notification-based bandwidth control is underway, the reroute unit 126 stops the bandwidth control. The reroute unit 126 then determines to transfer the information, to be received from the source device, to the destination device through the second path used as the detour path.

For example, the reroute unit 126 determines whether the amount of traffic, to be transmitted to the same L2 switch, of received information is equal to or larger than the bandwidth of the first path. In this case, upon determining that the amount of traffic, to be transmitted to the same L2 switch, of the received information is less than the bandwidth of the first path, the reroute unit 126 refers to the inter-switch routing table 111 and determines to transfer the traffic through the first path.

In the case where the amount of the received information to the same L2 switch is equal to or larger than the bandwidth, on the other hand, the reroute unit 126 specifies the path, searched for in the inter-switch MAC routing table 112, as a path through which the IP traffic of the received information is to be transferred. In other words, the reroute unit 126 determines to transfer the IP traffic to the destination device through the second path.

After transferring the IP traffic of the received information to the destination device through the second path, the reroute unit 126 determines whether the amount of FCoE traffic, to be transmitted to the same L2 switch, of the received information is equal to or larger than the bandwidth of the first path. In this case, upon determining that the amount of the FCoE traffic is less than the bandwidth of the first path, the reroute unit 126 refers to the inter-switch routing table 111 and determines to transfer the FCoE traffic through the first path.

In the case where the amount of the FCoE traffic is equal to or larger than the bandwidth, on the other hand, the reroute unit 126 transfers the FCoE traffic to the destination device through the first path and the second path while distributing the traffic in units of source_MAC, destination_MAC, and OX_ID.

For example, the reroute unit 126 assigns the same OX_ID (Originator Exchange_Identifier) to the FCoE traffic that has been distributed from the same source, and assigns an order ID, indicating the order, to each piece of distributed information.

In the case where the in-order delivery unit 127 receives frames with OX_IDs from the source device through the adjacent L2 switch and the host L2 switch is adjacent to the destination device (storage device), the in-order delivery unit 127 delivers the frames with OX_IDs to the destination device (storage device) in a predetermined order.

For example, the in-order delivery unit 127 determines whether the frames with OX_IDs have been received through a path other than those stored in the inter-switch routing table 111. In other words, the in-order delivery unit 127 determines whether the frames with OX_IDs have been received through a path other than the first path.

In the case where the frames with OX_IDs have not been received through a path other than the first path, the in-order delivery unit 127 ends the processing. In the case where the frames with OX_IDs have been received through a path other than the first path, on the other hand, the in-order delivery unit 127 stores the frames with OX_IDs in an in-order delivery cache, and transfers the frames to the storage device while performing in-order delivery of the frames.

The in-order delivery unit 127 then determines whether all the frames with the same OX_ID have been received. In this case, upon receiving all the frames with the same OX_ID, the in-order delivery unit 127 ends the processing. In the case where all the frames with the same OX_ID have not been received, on the other hand, the in-order delivery unit 127 re-requests the frames, not yet received, from the source device (information processing device), and then ends the processing.

Inter-Switch Routing Table

The inter-switch routing table 111 will be described next with reference to FIG. 3. FIG. 3 is a table of exemplary information stored in the inter-switch routing table. As illustrated in FIG. 3, for example, the inter-switch routing table 111 stores information in which "source switch", "destination switch", "port", and "cost" are associated with one another.

In this case, the "source switch" stored in the inter-switch routing table 111 indicates identifiers of source L2 switches. For example, "RB1" and "RB2" are stored as the "source switch". The "destination switch" indicates identifiers of destination L2 switches. For example, "RB3" and "RB2" are stored as the "destination switch".

The "port" indicates transmission ports. For example, "port C" and "port B" are stored as the "port". The "cost" indicates link costs. For example, "100" and "200" are stored as the "cost".

An example in the inter-switch routing table 111 illustrated in FIG. 3 indicates that, in the case where information is transferred from the RB1 to the RB3 through the "port C", the cost would be "100". The inter-switch routing table 111 illustrated in FIG. 3 also indicates that, in the case where information is transferred from the RB1 to the RB3 through the "port B", the cost would be "200". Note that the pieces of information illustrated in FIG. 3 are just examples, and may be arbitrarily changed without limitation.

Inter-Switch MAC Routing Table

The inter-switch MAC routing table 112 will be described next with reference to FIG. 4. FIG. 4 is a table of exemplary information stored in the inter-switch MAC routing table. As illustrated in FIG. 4, for example, the inter-switch MAC routing table 112 stores information in which "source switch", "destination switch", and "port" are associated with one another.

In this case, the "source switch" stored in the inter-switch MAC routing table 112 indicates information in which an identifier of a source L2 switch is associated with a MAC address of a source device from which information is transmitted. For example, "RB1/*xxx*" and "RB2/*xxx*" are stored as the "source switch". The "destination switch" indicates information in which an identifier of a destination L2 switch is associated with a MAC address of a destination device to which information is transmitted. For example, "RB3/*yyy*" and "RB3/*yyy*" are stored as the "destination switch". The "port" indicates transmission ports. For example, "port C" and "port B" are stored as the "port".

An example in the inter-switch MAC routing table 112 illustrated in FIG. 4 indicates that, in the case where information is transmitted from a source device with a MAC address of "xxx" to a destination device with a MAC address of "yyy", the second path described below can be used as the detour path. That is, the inter-switch MAC routing table 112 illustrated in FIG. 4 indicates that the RB1 first transfers information to the RB2 via the port B, with the RB3 set as the destination switch. The inter-switch MAC routing table 112 illustrated in FIG. 4 also indicates that the RB2 then transfers information to the RB3 as the destination switch via the port E. Note that the selection unit 124 stores information in the inter-switch MAC routing table 112.

Processing Operation in Converged LAN/SAN Network

Figure 5:
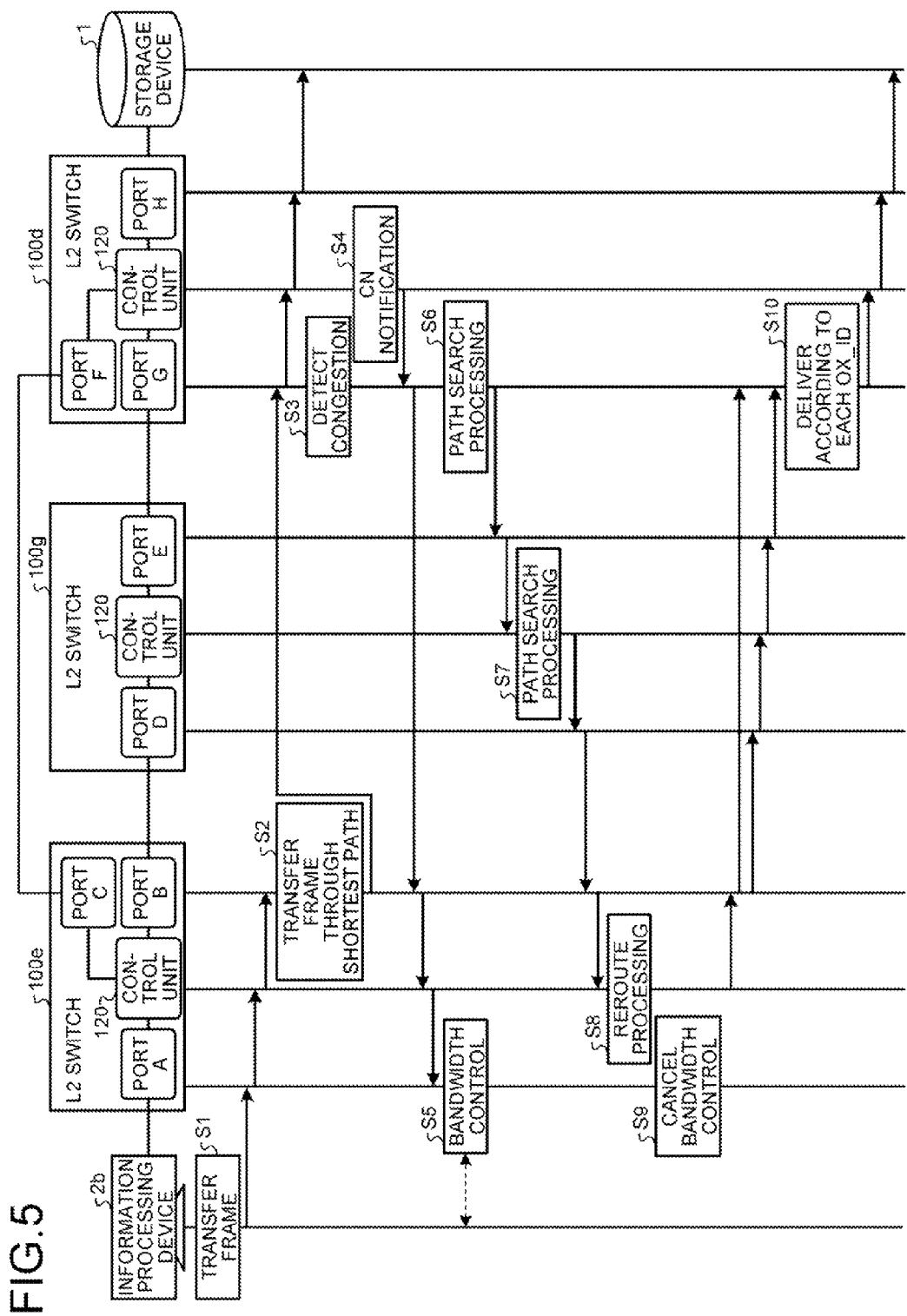
FIG. 5 is a diagram illustrating a processing operation of the L2 switch in the converged LAN/SAN network according to the first embodiment.

The processing operation of the L2 switch 100 in the converged LAN/SAN network according to the first embodiment will be described next with reference to FIG. 5. FIG. 5 is a diagram illustrating the processing operation of the L2 switch in the converged LAN/SAN network according to the first embodiment. An example will be described in FIG. 5 where information is transmitted from the information processing device 2*b* to the storage device 1 illustrated in FIG. 1. It is assumed here that a path that goes through the L2 switch 100*e* and the L2 switch 100*d* is the first path. Each of the L2 switches 100*e*, 100*g*, and 100*d* illustrated in FIG. 5 includes, as illustrated in FIG. 2, the control unit 120 including the switch unit 121, the congestion detection unit 122, the determination unit 123, the selection unit 124, the notification unit 125, the reroute unit 126, and the in-order delivery unit 127. However, the respective units included in the control unit 120 are not illustrated in FIG. 5.

As illustrated in FIG. 5, the information processing device 2*b* transfers a frame to the L2 switch 100*e*, with the storage device set as the destination of the frame (step S1). The switch unit 121 of the L2 switch 100*e* transfers the frame, which has been received from the information processing device 2*b* via a port A, through a shortest path (step S2). For example, the switch unit 121 of the L2 switch 100*e* transfers the frame from a port C to a port F of the L2 switch 100*d*.

The switch unit 121 of the L2 switch 100*d* receives the frame from the L2 switch 100*e* at the port F and transfers the received frame to a storage device 1. The congestion detection unit 122 of the L2 switch 100*d* detects congestion at the port F (step S3). The switch unit 121 of the L2 switch 100*d* then transmits a CN notification from the port F to the port C of the L2 switch 100e (step S4).

The switch unit 121 of the L2 switch 100e receives the CN notification from the L2 switch 100d via the port F. After that, the switch unit 121 in the control unit 120 of the L2 switch 100e transfers the CN notification to the information processing device 2b. As a result, the bandwidth between the information processing device 2b and the port A of the L2 switch 100e is controlled (step S5). For example, the traffic between the information processing device 2b and the port A of the L2 switch 100e is suspended for one second.

Subsequently, the selection unit 124 of the L2 switch 100d executes path search processing (step S6). For example, the selection unit 124 of the L2 switch 100d selects, as the second path, a path through which the frame is transferred to the L2 switch 100g via a port B of the L2 switch 100e and then transferred to the L2 switch 100d via a port E of the L2 switch 100g. After that, the notification unit 125 of the L2 switch 100d notifies the L2 switch 100g of the selected second path.

Upon receiving the notification of the second path from the L2 switch 100d, the determination unit 123 of the L2 switch 100g determines whether the host L2 switch 100g is adjacent to the information processing device 2b. In the example illustrated in FIG. 5, the determination unit 123 of the L2 switch 100g determines that the host L2 switch 100g is not adjacent to the information processing device 2b. The selection unit 124 of the L2 switch 100g then executes path search processing (step S7). The selection unit 124 of the L2 switch 100g selects, as the second path, a path through which the frame is transferred to the L2 switch 100g via the port B of the L2 switch 100e and then transferred to the L2 switch 100d via the port E of the L2 switch 100g. After that, the notification unit 125 of the L2 switch 100g notifies the L2 switch 100e of the selected second path.

Upon receiving the notification of the second path from the L2 switch 100g, the determination unit 123 of the L2 switch 100e determines whether the host L2 switch 100e is adjacent to the information processing device 2b. In the example illustrated in FIG. 5, the determination unit 123 of the L2 switch 100e determines that the host L2 switch 100e is adjacent to the information processing device 2b. After that, the reroute unit 126 of the L2 switch 100e executes reroute processing (step S8). For example, the reroute unit 126 of the L2 switch 100e transfers the IP traffic through the second path, and transfers the FCoE traffic through the first path and the second path while distributing the FCoE traffic according to each OX_ID. The reroute unit 126 of the L2 switch 100e also cancels the bandwidth control (step S9).

The in-order delivery unit 127 of the L2 switch 100d receives the FCoE traffic distributed according to each OX_ID and delivers the FCoE traffic to the storage device 1 according to each OX_ID (step S10).

Procedure of Processing by L2 Switch

The procedure of processing by the L2 switch according to the first embodiment will be described next with reference to FIGS. 6 to 8. The procedure of the path search processing by the L2 switch according to the first embodiment will be described with reference to FIG. 6. The procedure of the reroute processing by the L2 switch according to the first embodiment will be described with reference to FIG. 7. The procedure of processing of delivery to the storage device by the L2 switch according to the first embodiment will be described with reference to FIG. 8.

Path Search Processing

Figure 6:
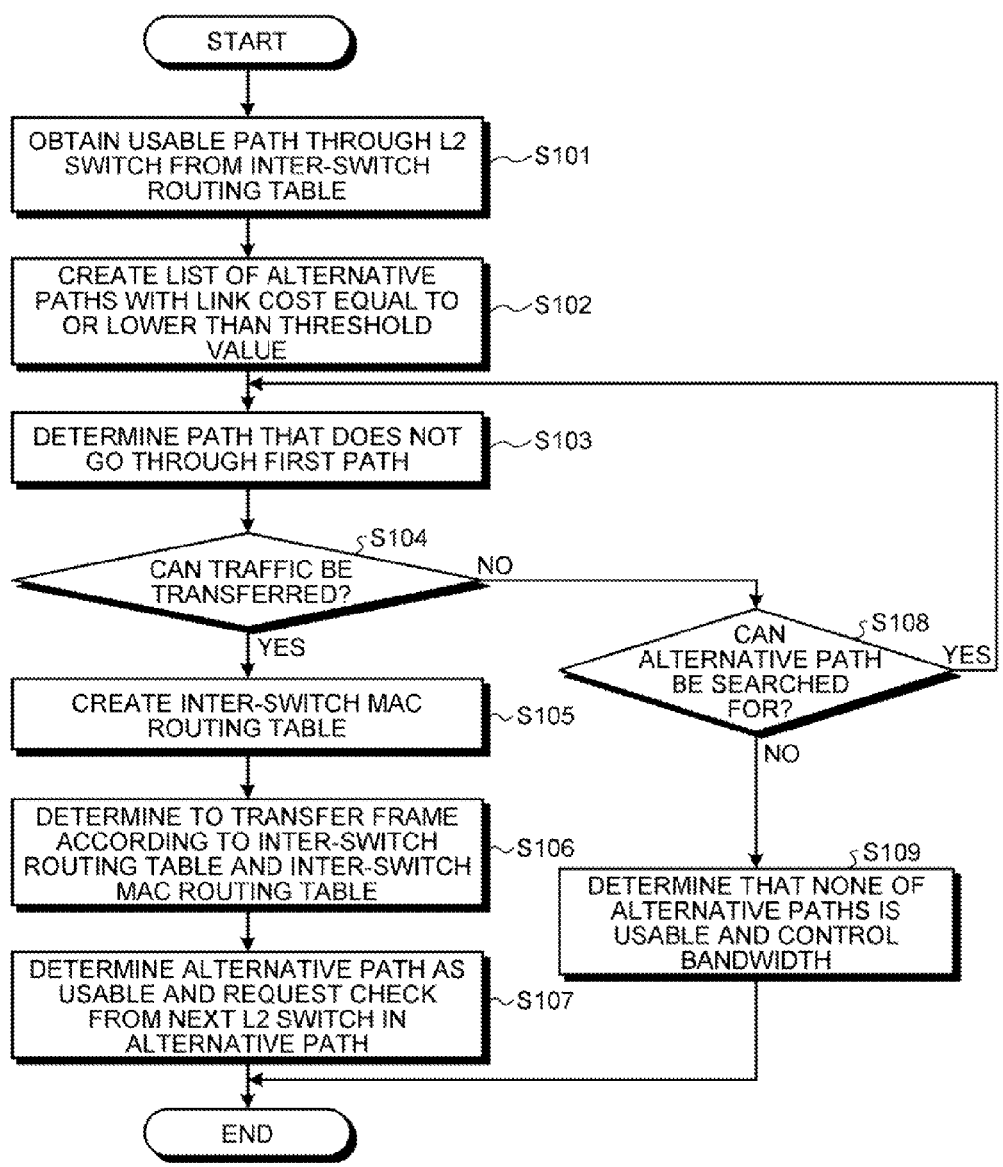
FIG. 6 is a flowchart illustrating a procedure of path search processing by the L2 switch according to the first embodiment.

FIG. 6 is a flowchart illustrating the procedure of the path search processing by the L2 switch according to the first embodiment. In the case where the congestion detection unit 122 determines that congestion has occurred, the selection unit 124 executes the following processing. The selection unit 124 executes the following processing also in the case where the notification is received from the adjacent L2 switch to the effect that the second path is to be used as the detour path and the determination unit 123 determines that the host L2 switch is not adjacent to the source device.

As illustrated in FIG. 6, the selection unit 124 obtains a usable path that goes through L2 switches from the inter-switch routing table 111 (step S101). The selection unit 124 then creates a list of alternative paths with a link cost equal to or lower than a threshold value (step S102), and determines a path that does not go through the first path (step S103).

After that, the selection unit 124 determines whether the traffic can be transferred through the determined path (step S104). Upon determining that the traffic can be transferred through the determined path (Yes in step S104), the selection unit 124 creates the inter-switch MAC routing table 112 (step S105). In other words, the selection unit 124 selects the second path.

The selection unit 124 then determines to transfer the frame using the inter-switch routing table 111 and the inter-switch MAC routing table 112 (step S106). After that, the notification unit 125 notifies the L2 switch adjacent in the second path that the second path is to be used as the detour path (step S107).

Upon determining that the traffic cannot be transferred through the determined path (No in step S104), the selection unit 124 searches for an alternative path and determines whether the alternative path can be determined (step S108). Upon determining that the path cannot be determined (No in step S108), the selection unit 124 determines that none of the alternative paths are usable and controls the bandwidth of the alternative paths (step S109). As a result, the CN notification-based bandwidth control is executed. Upon determining that the path can be determined (Yes in step S108), on the other hand, the selection unit 124 proceeds to step S103.

Reroute Processing

Figure 7:
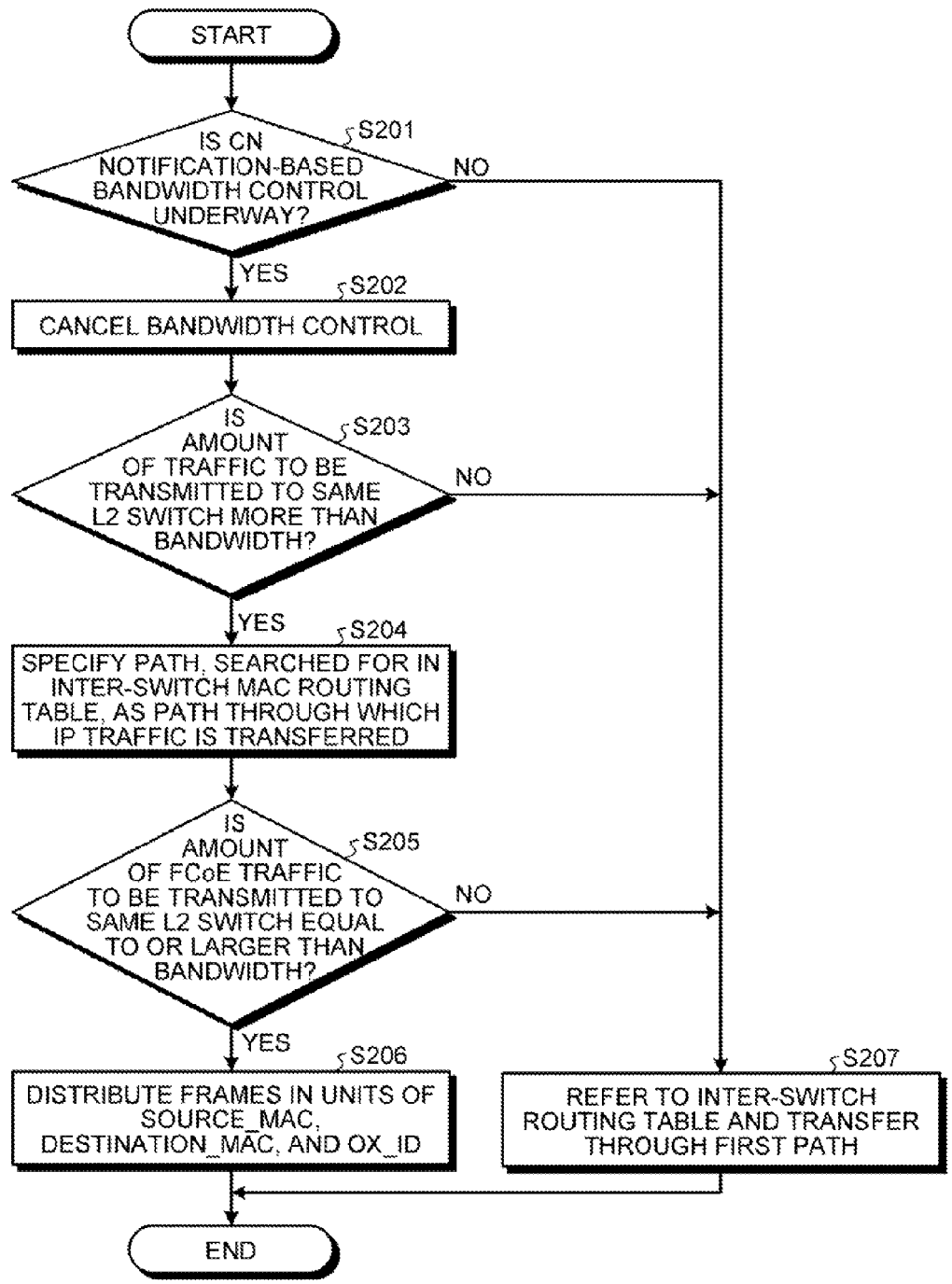
FIG. 7 is a flowchart illustrating a procedure of reroute processing by the L2 switch according to the first embodiment.

FIG. 7 is a flowchart illustrating the procedure of the reroute processing by the L2 switch according to the first embodiment. The reroute unit 126 executes the following processing in the case where the notification is received from the adjacent L2 switch to the effect that the second path is to be used as the detour path and the determination unit 123 determines that the host L2 switch is connected to the source device.

As illustrated in FIG. 7, the reroute unit 126 determines whether the CN notification-based bandwidth control is underway (step S201). Upon determining that the CN notification-based bandwidth control is not underway (No in step S201), the reroute unit 126 proceeds to step S207.

Upon determining that the CN notification-based bandwidth control is underway (Yes in step S201), on the other hand, the reroute unit 126 cancels the bandwidth control (step S202). The reroute unit 126 then determines whether the amount of traffic to be transmitted to the same L2 switch exceeds the upper limit of a physical bandwidth of a line connected to the corresponding port (step S203).

Upon determining that the amount of traffic to be transmitted to the same L2 switch does not exceed the upper limit of the physical bandwidth of the line connected to the corresponding port (No in step S203), the reroute unit 126 refers to the inter-switch routing table 111 and determines to transfer the traffic through the first path (step S207).

Upon determining that the amount of traffic to be transmitted to the same L2 switch exceeds the upper limit of the physical bandwidth of the line connected to the corresponding port (Yes in step S203), on the other hand, the reroute unit 126 specifies the path, searched for in the inter-switch MAC routing table 112, as a path through which IP traffic is transferred (step S204). In other words, the reroute unit 126 determines to transfer the IP traffic through the second path. The reroute unit 126 then determines whether the amount of FCoE traffic to be transmitted to the same L2 switch is equal to or larger than the bandwidth (step S205).

Upon determining that the amount of the FCoE traffic to be transmitted to the same L2 switch is less than the bandwidth (No in step S205), the reroute unit 126 refers to the inter-switch routing table 111 and determines to transfer the FCoE traffic through the first path (step S207).

Upon determining that the amount of the FCoE traffic to be transmitted to the same L2 switch exceeds the upper limit of the physical bandwidth of the line connected to the corresponding port (Yes in step S205), the reroute unit 126 distributes the frames in units of source MAC, destination_MAC, and OX_ID (step S206). The reroute unit 126 ends the reroute processing after step S206 or step S207.

Processing of Delivery to Storage Device

Figure 8:
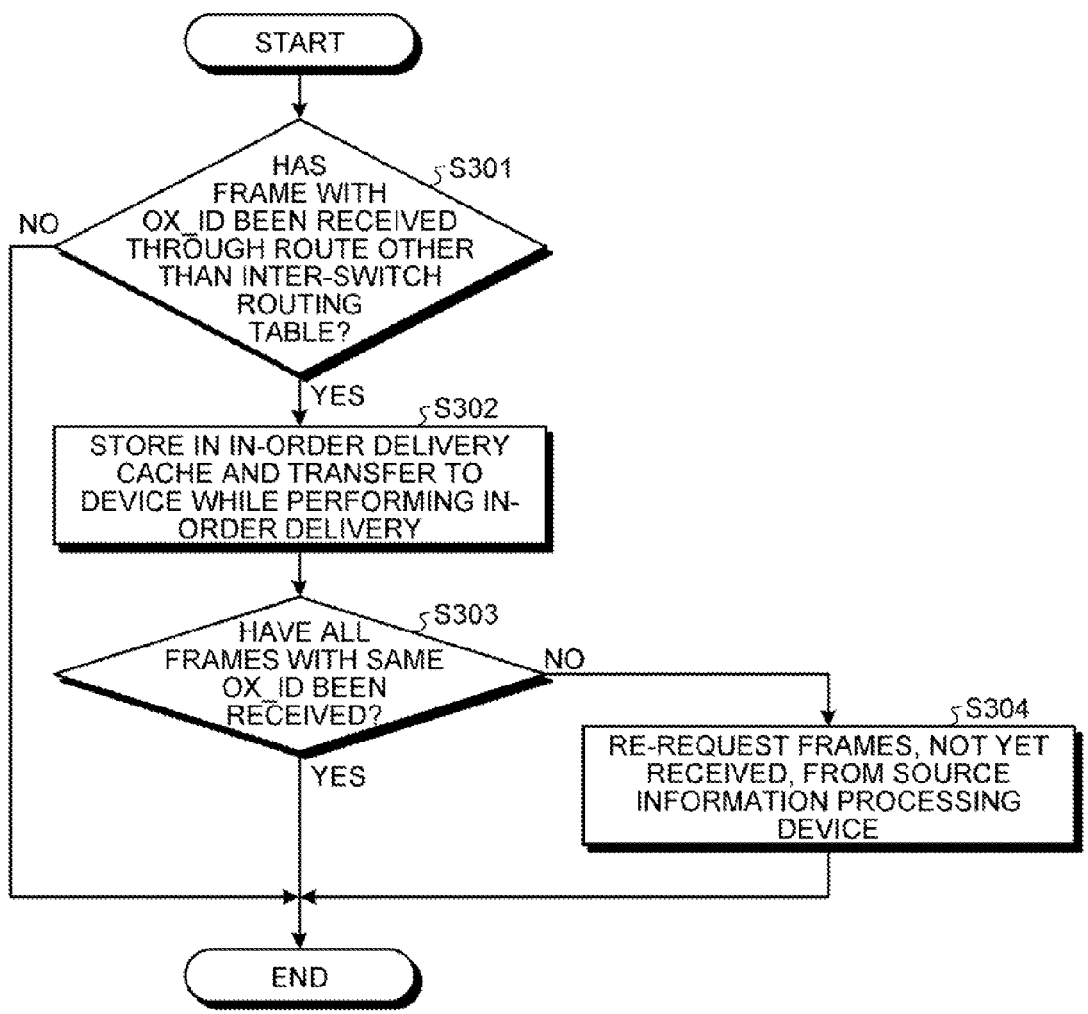
FIG. 8 is a flowchart illustrating a procedure of processing of delivery to a storage device by the L2 switch according to the first embodiment.

FIG. 8 is a flowchart illustrating the procedure of processing of delivery to the storage device by the L2 switch according to the first embodiment. The reroute unit 127 executes the following processing upon receiving frames with OX_IDs.

As illustrated in FIG. 8, the in-order delivery unit 127 determines whether the frames with OX_IDs have been received through a path other than those stored in the inter-switch routing table 111 (step S301). In other words, the in-order delivery unit 127 determines whether the frames with OX_IDs have been received through a path other than the first path.

In the case where the frames with OX_IDs have not been received through a path other than the first path (No in step S301), the in-order delivery unit 127 ends the processing. Upon receiving the frames with OX_IDs through a path other than the first path (Yes in step S301), on the other hand, the in-order delivery unit 127 stores the frames with OX_IDs in the in-order delivery cache on and transfers the frames to the storage device while performing in-order delivery of the frames (step S302).

The in-order delivery unit 127 then determines whether all the frames with the same OX_ID have been received (step S303). Upon receiving all the frames with the same OX_ID (Yes in step S303), the in-order delivery unit 127 ends the processing.

In the case where all the frames with the same OX_ID have not been received (No in step S303), on the other hand, the in-order delivery unit 127 re-requests the frames, not yet received, from the source device (information processing device) (step S304), and ends the processing.

Effects of First Embodiment

Figure 9A:
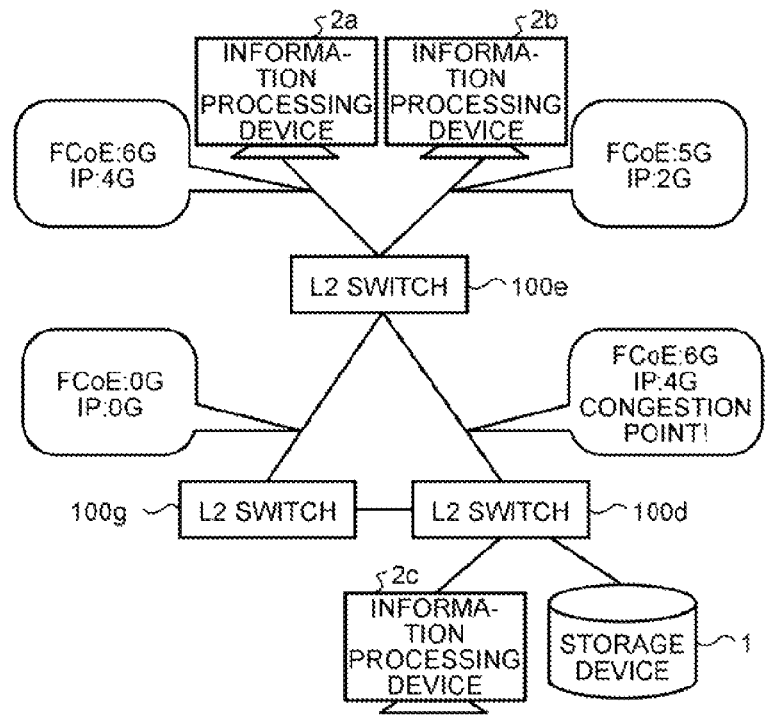
FIG. 9A is a diagram illustrating exemplary traffic before the reroute processing.
Figure 9B:
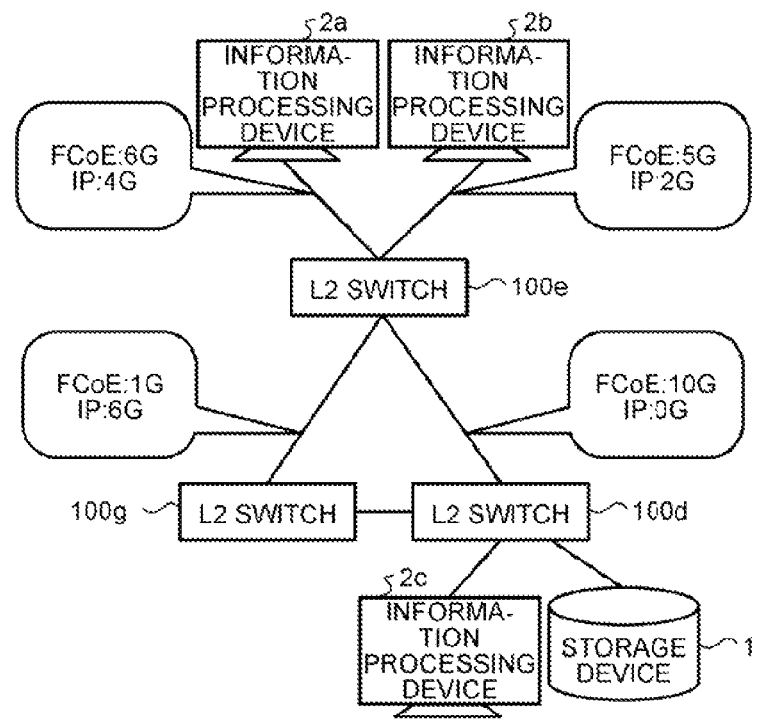
FIG. 9B is a diagram illustrating exemplary traffic after the reroute processing.
Figure 10:
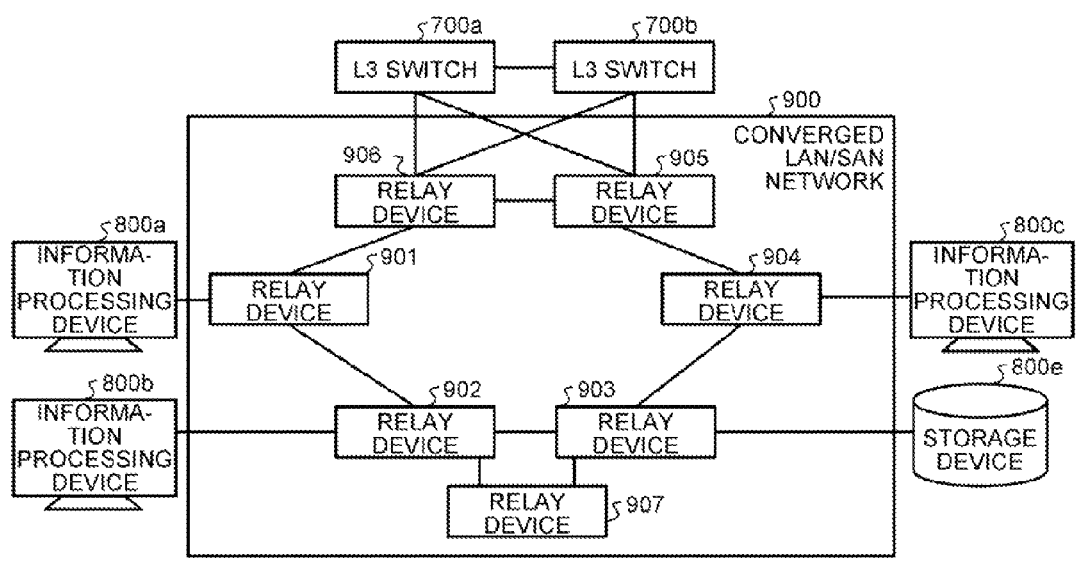
FIG. 10 is a diagram illustrating an exemplary converged LAN/SAN network.

The effects of the converged LAN/SAN network according to the first embodiment will be described with reference to FIGS. 9A and 9B. FIG. 9A is a diagram illustrating exemplary traffic before the reroute processing, and FIG. 9B is a diagram illustrating exemplary traffic after the reroute processing. A case will be described herein where 6 GB FCoE traffic and 4 GB IP traffic are transferred from the information processing device 2a, and 5 GB FCoE traffic and 2 GB IP traffic are transferred from the information processing device 2b. A path that goes through the L2 switch 100e and the L2 switch 100d is assumed to be the first path.

As illustrated in FIG. 9A, the switch unit 121 of the L2 switch 100e transfers, to the L2 switch 100d, the 17 GB information that has been received from the information processing device 2a and the information processing device 2b. As a result, congestion occurs between the L2 switch 100e and the L2 switch 100d.

Next, it is assumed in FIG. 9B that the L2 switch 100d has issued the notification to the effect that a path that goes through the L2 switch 100e, the L2 switch 100g, and the L2 switch 100d is the second path. As illustrated in FIG. 9B, the reroute unit 126 of the L2 switch 100e transfers 4 GB IP traffic and 2 GB IP traffic, received from the information processing device 2a and the information processing device 2b, respectively, to the L2 switch 100d via the L2 switch 100g.

The reroute unit 126 of the L2 switch 100e transfers, to the L2 switch 100d, 10 GB FCoE traffic among 6 GB FCoE traffic and 5 GB FCoE traffic received from the information processing device 2a and the information processing device 2b, respectively. The reroute unit 126 of the L2 switch 100e transfers the remaining 1 GB FCoE traffic to the L2 switch 100d via the L2 switch 100g.

In this manner, the L2 switch 100 of the converged LAN/SAN network 10 according to the first embodiment can increase an effective bandwidth.

The L2 switch 100 of the converged LAN/SAN network 10 according to the first embodiment can also make congestion occur less frequently by distributing the traffic.

The L2 switch 100 of the converged LAN/SAN network 10 according to the first embodiment can also reduce the cost that would be incurred to structure a high-bandwidth network. An increase in the number of switches enhances scalability and performance, thereby achieving redundancy and high speed at the same time.

[b] Second Embodiment

Note that the present invention can be implemented in various embodiments other than the embodiment described above. Another embodiment of the present invention will be described as a second embodiment.

System Configuration and the Like

Among each processing described in the present embodiment described above, all or part of the processing that has been described as automated processing can be executed manually. Alternatively, all or part of the processing that has been described as manual processing can be executed in an automated manner by a known method. In addition, the procedure, control, and specific names described/illustrated in the above description/drawings can be arbitrarily changed unless otherwise specified.

In the above description, the selection unit 124 creates a list of alternative paths with a link cost equal to or lower than a threshold value and determines a path that does not go through the first path. However, the procedure is not limited to this example. For example, the selection unit 124 may determine a path that does not go through the first path by creating a list of alternative paths with a delay time or the number of hops equal to or lower than a threshold value.

The respective constituent elements illustrated are just functional concepts, and do not necessarily need to be physically configured as illustrated. For example, the selection unit 124 and the notification unit 125 may be integrated with each other in the L2 switch 100. Furthermore, all or any part of the processing functions to be performed by the respective units can be implemented by a CPU and a program to be analyzed and executed by the CPU, or can be implemented as hardware based on a wired logic.

Through the above embodiments, it is possible to use the bandwidth effectively.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay device comprising:
a processor; and
a memory that stores therein a plurality of relay paths connecting a source device and a destination device that receives information from the source device, the processor being configured to execute a process including:
detecting occurrence of congestion between the relay device and a first relay device adjacent to the relay device in a first path among the plurality of relay paths;
selecting a second path from among the plurality of relay paths stored in the memory in the case where occurrence of congestion is detected at the detecting;
notifying, through a second relay device adjacent to the relay device in the second path, a third relay device adjacent to the source device that the second path is to be used as a detour path;
determining whether the relay device is adjacent to the source device upon receiving a notification, from the second relay device adjacent to the relay device in the second path, to the effect that the second path is to be used as the detour path; and
transferring the information, received from the source device, to the destination device through the second path used as the detour path in the case where the relay device is determined to be adjacent to the source device at the determining.

2. The relay device according to claim 1, wherein the transferring further includes first transferring, to the destination device through the second path, information other than that used for reading from or writing to a storage device among the information received from the source device in the case where an amount of the information received from the source device is equal to or larger than a bandwidth of the first path.

3. The relay device according to claim 2, wherein after the first transferring, the transferring still further includes second transferring, to the destination device through the first path and the second path, information including that used for reading from or writing to the storage device in the case where an amount of information received from the source device is equal to or larger than the bandwidth of the first path.

4. The relay device according to claim 1, wherein, upon receiving the notification, the selection includes further selecting the notified second path to be used as the detour path in the case where the relay device is determined not to be adjacent to the source device at the determining and congestion has not occurred between the relay device and the second relay device, and
the notifying further includes notifying, through the second relay device different from a source relay device of the notification, the third relay device that the second path selected at the selecting is to be used as the detour path.

5. The relay device according to claim 1, wherein, upon receiving the notification, the selection includes further selecting a new second path from among the plurality of relay paths stored in the memory in the case where the relay device is determined not to be adjacent to the source device at the determining and congestion has occurred between the relay device and the second relay device, and
the notifying further includes notifying another relay device, which is adjacent to the relay device in the new second path, that the new second path is to be used as the detour path.

6. The relay device according to claim 1, further comprising delivering distributed information, including that used for reading from or writing to a storage device, to the storage device in a predetermined order upon receiving the distributed information from the source device through the first or second relay device.

7. A method of controlling a relay device, that is executed by the relay device, the method comprising:
detecting occurrence of congestion between the relay device and a first relay device in a first path among a plurality of relay paths connecting a source device and a destination device that receives information from the source device;
selecting a second path from a storage unit that stores the plurality of relay paths, in the case where the occurrence of congestion has been detected;
notifying, through a second relay device adjacent to the relay device in the second path, a third relay device adjacent to the source device that the second path is to be used as a detour path;
determining whether the relay device is adjacent to the source device upon receiving a notification, from the second relay device adjacent to the relay device in the second path, to the effect that the second path is to be used as the detour path; and
transferring the information, received from the source device, to the destination device through the second path used as the detour path in the case where the relay device is determined to be adjacent to the source device at the determining.

8. A relay system comprising:
a source device;
a destination device that receives information from the source device; and
a plurality of relay devices that form a plurality of relay paths connecting the source device and the destination device,
wherein each of the plurality of relay devices includes:
a processor; and
a memory that stores therein the plurality of relay paths, the processor being configured to execute a process including:
detecting occurrence of congestion between the relay device and a first relay device adjacent to the relay device in a first path among the plurality of relay paths;
selecting a second path from among the plurality of relay paths stored in the memory in the case where the occurrence of congestion is detected at the detecting;
notifying, through a second relay device adjacent to the relay device in the second path, a third relay device adjacent to the source device that the second path is to be used as a detour path;
determining whether the relay device is adjacent to the source device upon receiving a notification, from the second relay device adjacent to the relay device in the second path, to the effect that the second path is to be used as the detour path; and
transferring the information, received from the source device, to the destination device through the second path used as the detour path in the case where the relay device is determined to be adjacent to the source device at the determining.

* * * * *